(12) United States Patent
McLain

(10) Patent No.: US 6,493,758 B1
(45) Date of Patent: Dec. 10, 2002

(54) OFFLINE VIEWING OF INTERNET CONTENT WITH A MOBILE DEVICE

(75) Inventor: Jay F. McLain, Woodinville, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/149,694

(22) Filed: Sep. 8, 1998

(51) Int. Cl.⁷ .............................................. G06F 13/00
(52) U.S. Cl. ..................................... 709/227; 702/217
(58) Field of Search ............................... 709/217, 219, 709/246, 224, 227; 704/233; 717/11; 395/200.31

(56) References Cited

U.S. PATENT DOCUMENTS

| | | | | |
|---|---|---|---|---|
| 5,727,159 A | * | 3/1998 | Kikinis | 709/246 |
| 5,737,560 A | * | 4/1998 | Yohanan | 345/349 |
| 5,809,250 A | * | 9/1998 | Kisor | 709/227 |
| 5,935,210 A | * | 8/1999 | Stark | 709/224 |
| 5,958,006 A | * | 9/1999 | Eggleston et al. | 709/219 |
| 5,974,238 A | * | 10/1999 | Chase, Jr. | 395/200.78 |
| 5,983,176 A | * | 11/1999 | Hoffert et al. | 704/233 |
| 6,096,096 A | * | 8/2000 | Murphy et al. | 717/11 |

OTHER PUBLICATIONS

Pendragon Software Corporation, "InfroRover™—What's New", Aug. 26, 1998.

Karl Beiser, "Getting Grabby: Offline Web Browsing", Online, Mar. 1997.

* cited by examiner

*Primary Examiner*—David Wiley
(74) *Attorney, Agent, or Firm*—Westman, Champlin & Kelly, P.A.; S. Koehler

(57) ABSTRACT

A method and system for transferring offline browsing content information of a wide area network from a host computer to a mobile device includes connecting the mobile device to the host computer and obtaining characteristic information of the mobile device pertaining to at least one of hardware and software capabilities of the mobile device. The content information is transferred from the host computer to the mobile device as a function of the characteristic information.

31 Claims, 12 Drawing Sheets

OFFLINE VIEWING OF INTERNET CONTENT WITH A MOBILE DEVICE

BACKGROUND OF THE INVENTION

The present invention relates to personal mobile computing devices commonly known as mobile devices. More particularly, the present invention relates to a system and method for offline viewing of content from a wide area network, such as content from the Internet, with the mobile device.

Mobile devices are small electronic computing devices often referred to as personal digital assistants. Many such mobile devices are hand-held devices, or palm-size devices, which comfortably fit within the hand. One commercially available mobile device is sold under the trade name Hand-Held PC (or H/PC) having software provided by Microsoft Corporation of Redmond, Washington.

Generally, the mobile device includes a processor, random access memory (RAM), and an input device such as a keyboard and a display. The keyboard can be integrated with the display, such as where the keyboard is incorporated as a touch sensitive display. A communication interface is optionally provided and is commonly used to communicate with a desktop computer. A replaceable or rechargeable battery powers the mobile device. Optionally, the mobile device can receive power from an external power source that overrides or recharges the built-in battery.

Commonly, the mobile device is used in conjunction with a desktop computer. For example, the user of the mobile device may also have access to, and use, a desktop computer at work or at home, or both. The user typically runs the same types of applications on both the desktop computer and on the mobile device. Thus, it is quite advantageous for the mobile device to be designed to be coupled to the desktop computer to exchange information with, and share information with, the desktop computer.

Another technique for providing information to such mobile devices is through a wireless transmission link. Such information can include electronic mail or pager information including news, weather; sports, traffic and local event information.

In addition to the above-mentioned uses of the mobile device, there is also a desire to use the mobile device for "offline" browsing of Internet content. U.S. patent application Ser. No. 09/107,666 filed Jun. 30, 1998, entitled "SYSTEM FOR DELIVERING DATA CONTENT OVER A LOW BIT RATE TRANSMISSION CHANNEL" and U.S. patent application Ser. No. 09/107,941. filed Jun. 30, 1998, entitled "CHANNEL DEFINITION ARCHITECTURE EXTENSION" describe a system and method wherein Web or Internet content is rendered on a mobile device using a channel definition format, (CDF) file, a set of script files and a set of data files. Briefly, navigation of the content on the mobile device is performed using the CDF file, which includes references to the script files and the data files. When a particular page of content is to be displayed, a script file is accessed and is used to operate upon the data file in order to render the desired information. This architecture allows wireless updates of data files, because, typically, only the data files will change with time. However, if desired, the CDF file and the script files can also be updated wirelessly. Likewise, each of these files can be updated through synchronization of the mobile device with the desktop computer.

Although the above-described system allows wireless updates for Internet content, the content provider must adapt to this architecture and make available to the mobile device user separate script files and data files. In many cases, this requires the content provider to maintain two different types of Internet sites, one for browsers that expect to receive HTML (hypertext markup language) pages for rendering information, and a second site using the above-described architecture.

Another technique for "offline" browsing with a desktop computer involves traversing or "crawling" through a particular Internet site and storing the information locally. If the information is stored as pages, simple transfer of this information to the mobile device would not be efficient since the mobile device typically has limited memory resources and the information may contain portions that cannot be used or are unsuitable for the mobile device. Thus, memory may be wasted in storing irrelevant information.

There is an ongoing need to provide efficient offline browsing of content, particularly, when performed on a mobile device. The downloading of information for offline browsing should allow access to existing Internet sites without requiring the content provider to maintain separate Internet sites.

SUMMARY OF THE INVENTION

A method and system for transferring offline browsing content information of a wide area network from a host computer to a mobile device includes connecting the mobile device to the host computer and obtaining characteristic information of the mobile device pertaining to at least one of hardware and software capabilities of the mobile device. The content information is transferred from the host computer to the mobile device as a function of the characteristic information.

DETAILED DESCRIPTION OF THE PREFERRED EMBODIMENTS

Figure 1:
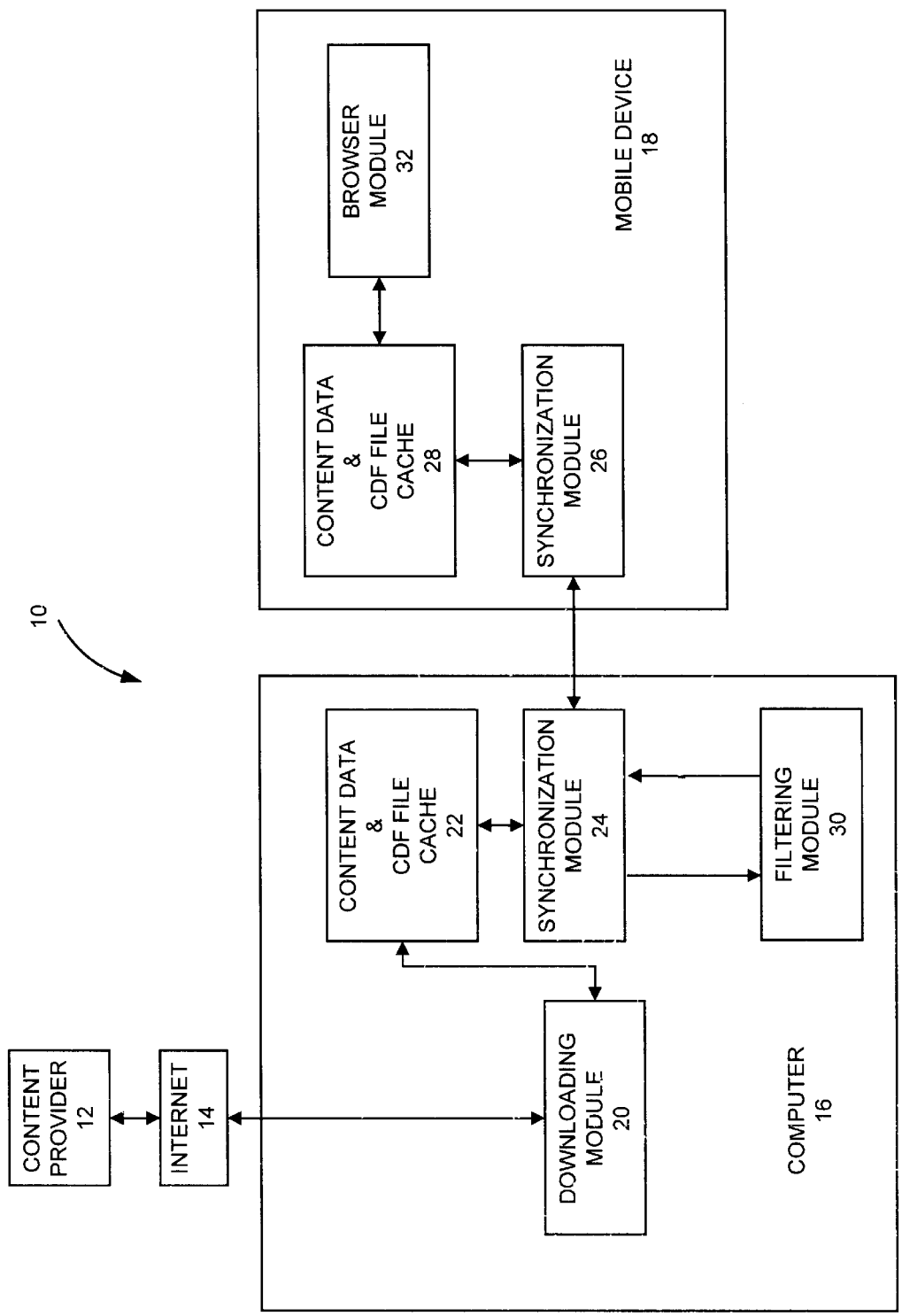
FIG. 1 is a simplified block diagram illustrating one embodiment of a mobile device in a system in accordance with the present invention.

FIG. 1 illustrates a system 10 in which the present invention is illustratively implemented. System 10 includes content provider 12, host computer 16 (for example, a desktop computer) and mobile device 18. Content provider 12 provides any suitable type of data from a database or other data source. For example, content. provider 12 is discussed hereinafter as a provider of Internet world wide web content that is connected to and transmitted through a wide area network, herein, Internet 14. Typically, the content is provided in .standard formats, such as HTML, JPEG, GIF or WAV data files. Content provider 12 organizes the data files of content as a "Web site" as is commonly known in the art. A user can access content of content provider 12 using a browser operated on the desktop computer 16. A suitable browser includes Internet Explorer 4.0 by the Microsoft Corporation of Redmond, Wash. The browser receives the content which can include text graphics, audio or video as is known in the art. The content provider 12 provides content in the form of "pages" that are typically viewable on a monitor of the desktop computer 16. The pages can be stored in memory devices of the content provider 12 in a static hierarchical structure, or any or all of the pages can be dynamically created and transferred to the desktop computer 16 upon request by the user. Dynamic creation of pages allows easy updating of information stored at content provider 12 since static pages do not have to be rewritten. Some Web sites of content providers 12 include a channel definition format (CDF) file that, when downloaded to a user, provides a local index or hierarchical structure of the content available from content provider 12. The Channel Definition Format is an application of the Extensible Markup Language (XML) The Channel Definition Format is an open specification that permits a content provider to offer frequently updated collections of information, or channels, from any server for delivery to compatible receiver programs (browsers) on desktop computer or other information appliances.

Although the Channel Definition Format is used by some content providers, many content providers do not organize content in this manner. One aspect of the present invention, as will be described below, includes generating a CDF file based on the content of the content provider 12 and using this information to download content to the mobile device 18 for offline browsing.

Referring to FIG. 1, a content downloading module located on the desktop computer 16 accesses the content provider 12 and obtains pages of content information that, in turn, is stored in cache 22. In a preferred embodiment, the user can specify preferences or download options for the content download process. For instance, images and sound clips found during the download process can or cannot be made available for offline browsing. In addition, the amount of data (bytes) downloaded or the levels of the Web site that should be downloaded can be limited.

Downloading module 20 stores the CDF file, if available, or alternatively generates a CDF file for the site of the content provider. The CDF file is also stored in cache 22. The content and CDF file stored in cache 22 is transferred from the desktop computer 16 to mobile device 18 through synchronization modules 24 and 26. The content and CDF file is stored locally on mobile device 18 in cache 28. A second aspect of the present invention includes a content filter module 30, located on desktop computer 16, that operates upon the content data from cache 22, and filters or transforms the content as a function of characteristics of the type of mobile device 18. This minimizes content data stored in cache 28 where memory or storage capabilities are typically limited. A browser module 32 is provided on mobile device 18 to access the CDF file in cache 28 to render content during offline browsing.

As described above, desktop computer 16 includes synchronization module 24. Briefly, synchronization module 24 is configured to interact with synchronization module 26 on mobile device 18 such that data which are the subject of synchronization can be synchronized from desktop computer 16 to mobile device 18, or vice versa. Once synchronized, both files (those on desktop computer 16 and mobile device 18) contain up to date information.

In order to accomplish synchronization, synchronization modules 24 and 26 run on both mobile device 18 and desktop computer 16. The synchronization components communicate with one another through well defined interfaces to manage communication and synchronization.

Figure 2:
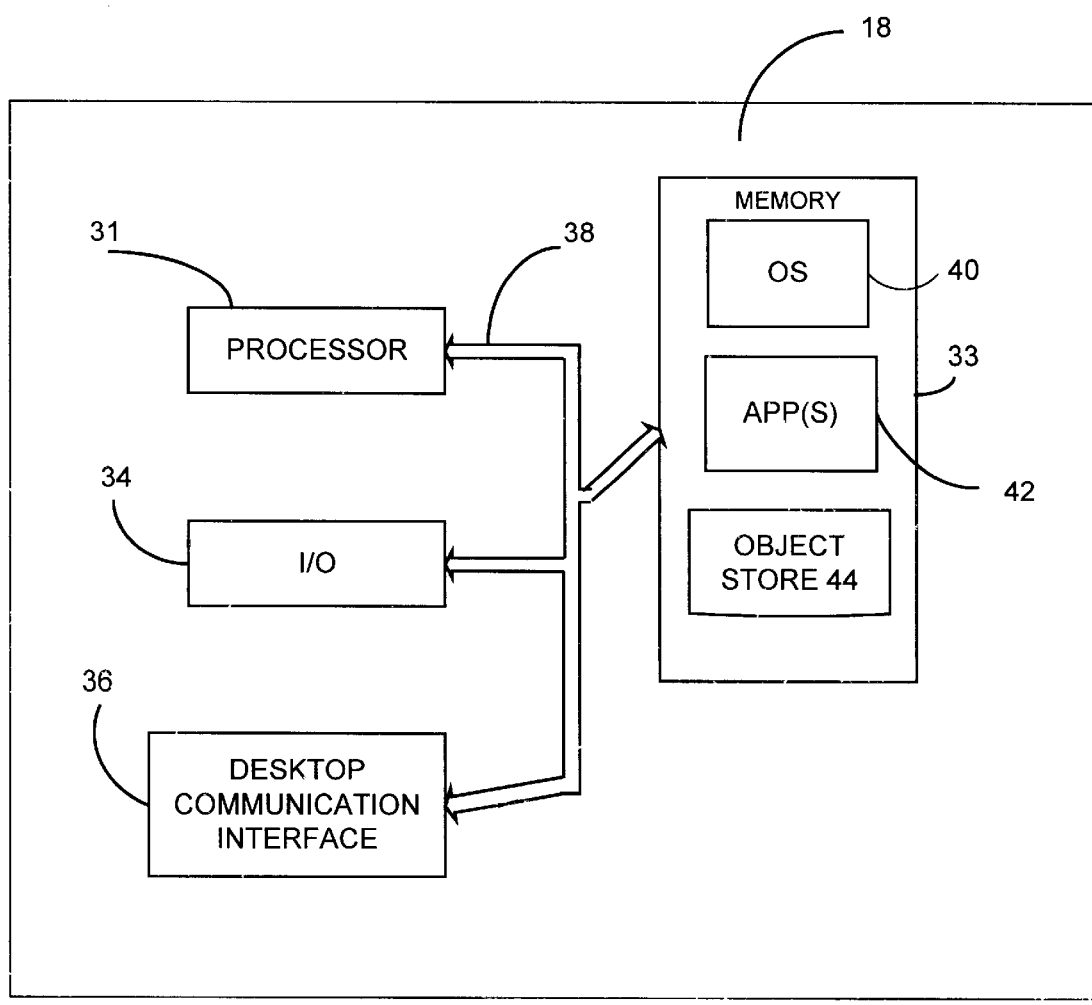
FIG. 2 is a more detailed block diagram of one embodiment of a mobile device shown in FIG. 1.

FIG. 2 is a more detailed block diagram of mobile device 18. Mobile device 18 preferably includes processor 31, memory 33, input/output (I/O) components 34 and desktop communication interface 36. In a preferred embodiment, these components of mobile device 18 are coupled for communication with one another over a suitable bus 38.

Memory 33 is preferably implemented as non-volatile electronic memory such as random access memory (RAM) with a battery back-up module (not shown) such that information stored in memory 33 is not lost when the general power to mobile device 18 is shut down. A portion of memory 33 is preferably allocated as addressable memory for program execution, while another portion of memory 33 is preferably used for storage, such as to simulate storage on a disc drive.

Memory 33 includes operating system 40, an application program 42 (such as a personal information manager or PIM) as well as an object store 44. During operation, operating system 40 is preferably executed by processor 31 from memory 33. Operating system 40, in one preferred embodiment, is a WINDOWS CE brand operating,system commercially available from Microsoft Corporation. The operating system 40 is preferably designed for mobile devices, and implements database features which can be utilized by application programs through a set of exposed application programming interfaces (APIs) and methods. The objects in an object store 44 are preferably maintained by application programs and operating system 40, at least partially in response to calls to the exposed application programming interfaces and methods.

I/O components 34, in one preferred embodiment, are provided to facilitate input and output operations from a user of mobile device 18. I/O, components 34 are described in greater detail with respect to FIGS. 3 and 4.

Desktop communication interface 36 is provided as any suitable communication interface, such as a serial connection, a network interface, an infrared link or a modem connection. Interface 36 is used to communicate with desktop computer 16. Thus, interface 36 preferably includes synchronization module 26 for communicating with desktop computer 16.

Figure 3:
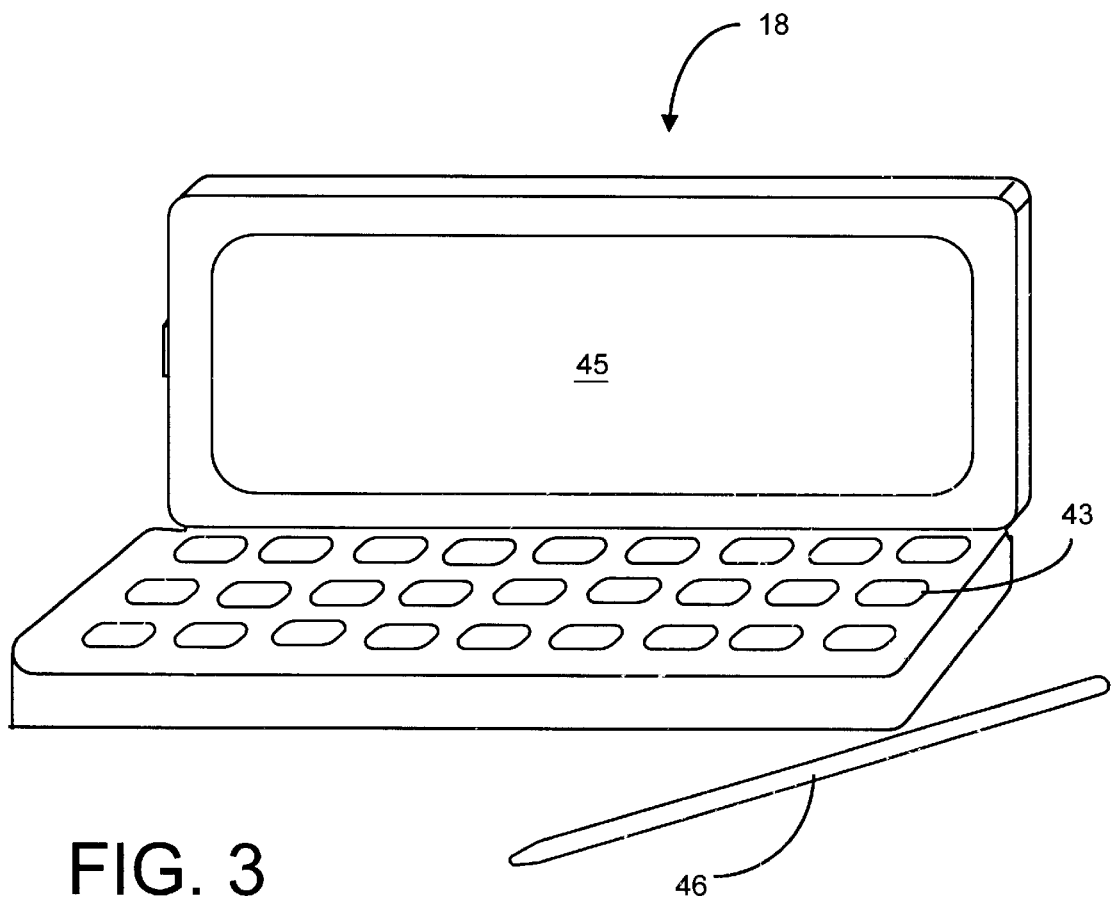
FIG. 3 is a simplified pictorial illustration of one embodiment of the mobile device shown in FIG. 2.

FIG. 3 is a simplified pictorial illustration of one preferred embodiment of a mobile device 18 which can be used in accordance with the present invention. Mobile device 18, as illustrated in FIG. 3, can be a desktop assistant sold under the designation H/PC having software provided by the Microsoft Corporation. In one preferred embodiment, mobile device 18 includes a miniaturized keyboard 43, display 45 and stylus 46. In the embodiment shown in FIG. 3, display 45 is a liquid crystal display (LCD) which uses a contact sensitive display screen in conjunction with stylus 46. Stylus 46 is used to press or contact the display 45 at designated coordinates to accomplish certain user input functions. Miniaturized keyboard 43 is preferably implemented as a miniaturized alpha-numeric keyboard, with any suitable and desired function keys which are also provided for accomplishing certain user input functions.

Figure 4:
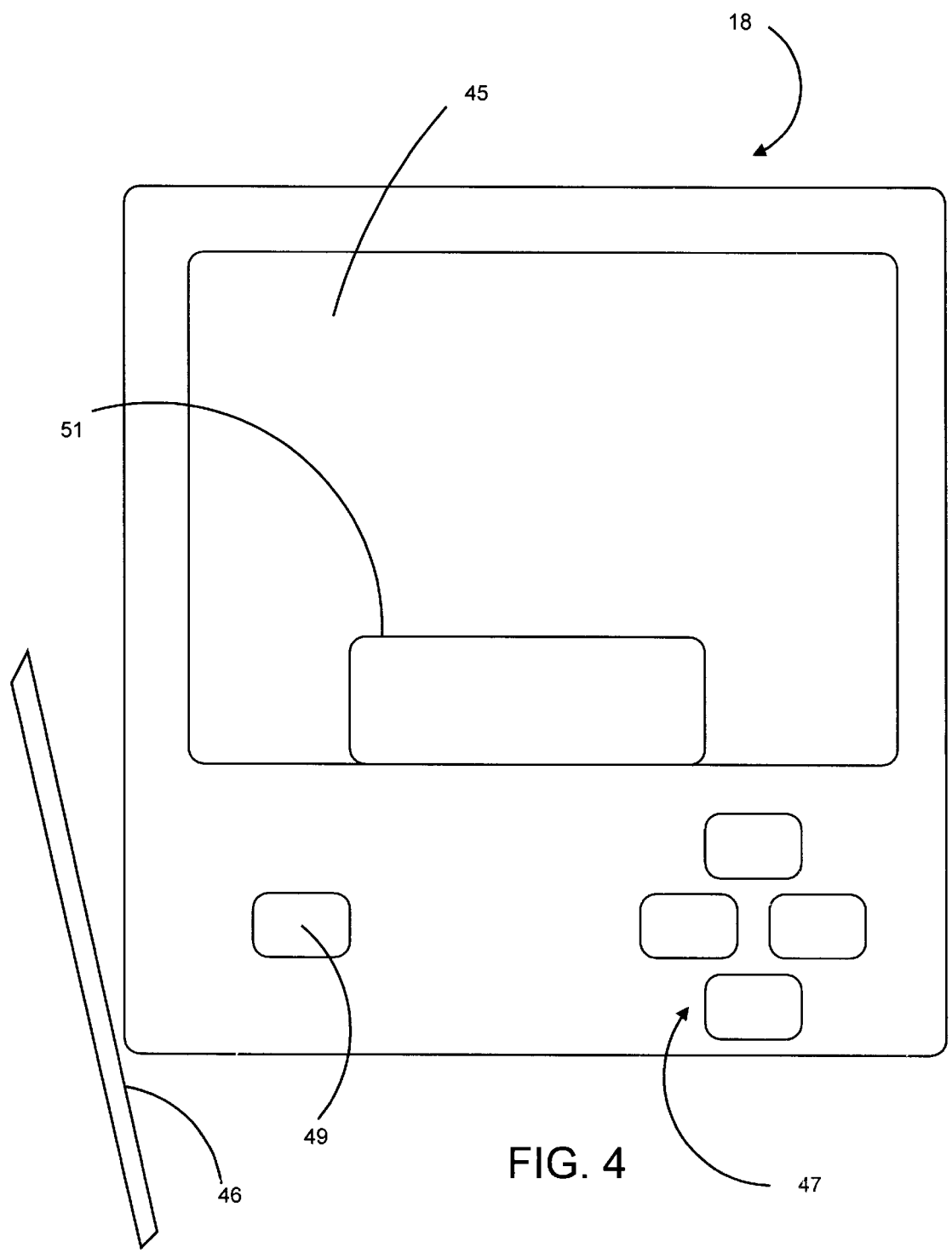
FIG. 4 is a simplified pictorial illustration of another embodiment of the mobile device shown in FIG. 2.

FIG. 4 is another simplified pictorial illustration of the mobile device 18 in accordance with another preferred embodiment of the present invention. Mobile device 18, as illustrated in FIG. 4, includes some items which are similar to those described with respect to FIG. 3, and are similarly numbered. For instance, mobile device 18, as shown in FIG. 4, also includes touch sensitive screen 45 which can be used, in conjunction with stylus 46, to accomplish certain user input functions. It should be noted that the display 45 for the mobile device as shown in FIGS. 3 and 4 can be the same size as one another, or different sizes from one another, but would typically be much smaller than a conventional display used with a desktop computer. For example, display 45 shown in FIGS. 3 and 4 may be defined by a matrix of only 240×320 coordinates, or 16×160 coordinates, or any other suitable size.

The mobile device 18 shown in FIG. 4 also includes a number of user input keys or buttons (such as scroll buttons 47) which allow the user to scroll through menu options or other display options which are displayed on display 45, or which allow the user to change applications, without contacting display 45. In addition, the mobile device 18 also shown in FIG. 4 also preferably includes a power button 49 which can be used to turn on and off the general power to the mobile device 18.

It should also be noted that, in the embodiment illustrated in FIG. 4, mobile device 18 includes a handwriting area 51. Handwriting area 51 can be used in conjunction with. stylus 46 such that the user can write messages which are stored in memory 33 for later use by the mobile device 18. In one illustrative embodiment, the handwritten messages are simply stored in handwritten form and can be recalled by the user and displayed on the display screen 45 such that the user can review the handwritten messages entered into the mobile device 18. In another preferred embodiment, mobile device 18 is provided with a character recognition module such that the user can enter alpha-numeric information into mobile device 18 by writing that alpha-numeric information on area 51 with stylus 46. In that instance, character recognition module in the mobile device 18 recognizes the alpha-numeric characters and converts the characters into computer recognizable alpha-numeric characters which can be used by the application programs 42 in mobile device 18.

Figure 5:
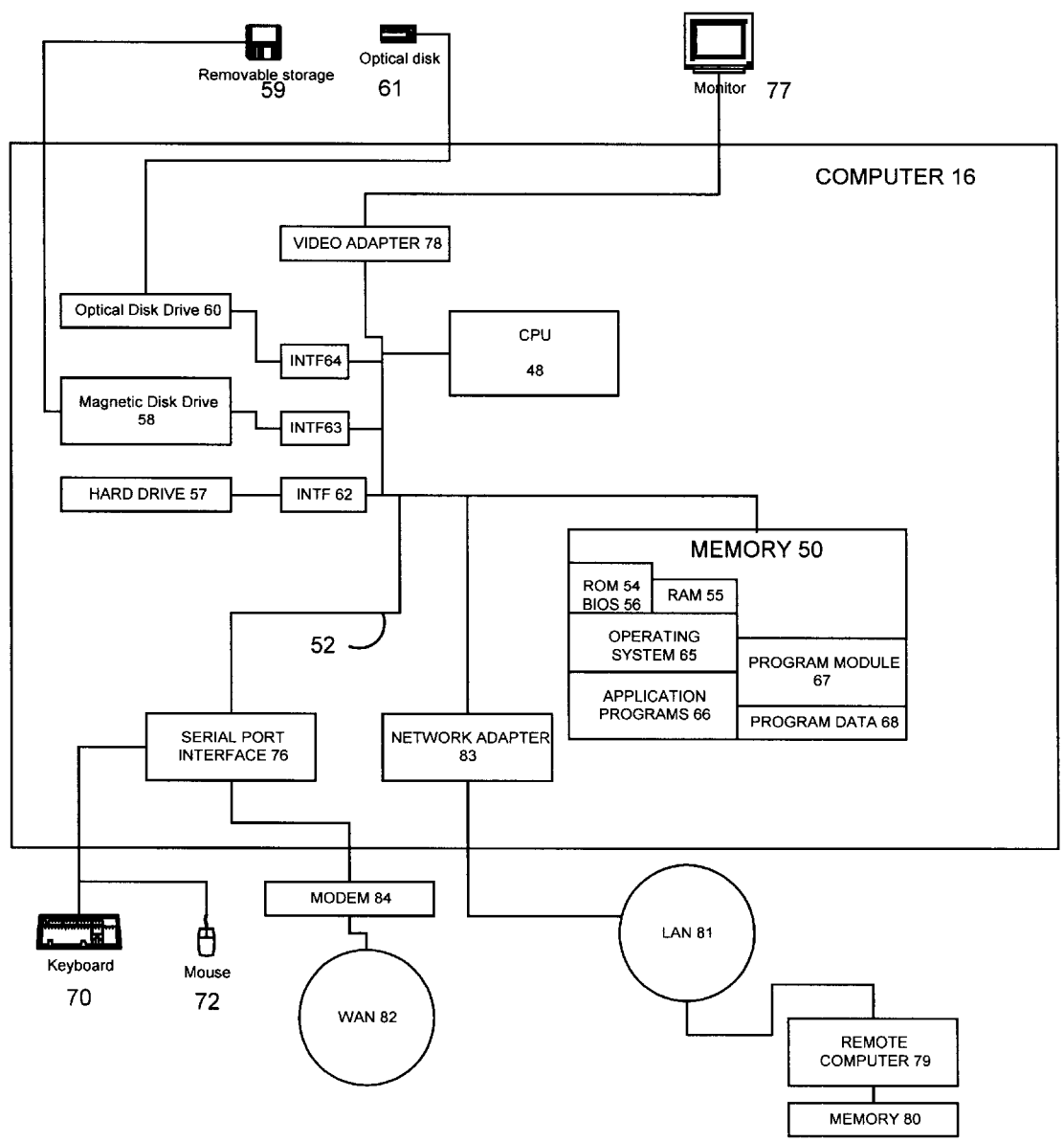
FIG. 5 is a block diagram of one embodiment of a desktop computer in accordance with one aspect of the present invention.

FIG. 5 and the related discussion are intended to provide a brief, general description of a suitable desktop computer 16 in which portions of the invention may be implemented. Although not required, the invention. will be described, at least in part, in the general context of computer-executable instructions, such as program modules, being executed by a desktop computer 16 or mobile device 18. Generally, program modules include routine programs, objects, components, data structures, etc. that perform particular tasks or implement particular abstract data types. Moreover those skilled in the art will appreciate that desktop computer 16 may be implemented with other computer system configurations, including multiprocessor systems, microprocessor-based or programmable consumer electronics network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 5, an exemplary system for implementing desktop computer 16 includes a general purpose computing device in the form of a conventional personal computer, including processing unit 48, a system memory 50, and a system bus 52 that couples various system components including the system memory 50 to the processing unit 48. The system bus 52 may be any of several types of bus structures including a memory bus or memory controller, a peripheral bus, and a local bus using any of a variety of bus architectures. The system memory 50 includes read only memory (ROM) 54 and random access memory (RAM) 55. A basic input/output system (BIOS) 56, containing the basic routine that helps to transfer information between elements within the desktop computer 16, such as during start-up, is stored in ROM 54. The desktop computer 16 further includes a hard disk drive 57 for reading from and writing to a hard disk (not shown) a magnetic disk drive 58 for reading from or writing to removable magnetic disk 59, and an optical disk drive 60 for reading from or writing to a removable optical disk 61 such as a CD ROM or other optical media. The hard disk drive 57, magnetic disk drive 58, and optical disk drive 60 are connected to the system bus 52 by a hard disk drive interface 62, magnetic disk drive interface 63, and an optical drive interface 64, respectively. The drives and the associated computer-readable media provide nonvolatile storage of computer readable instructions, data structures, program modules and other data for the desktop computer 16.

Although the exemplary environment described herein employs a hard disk, a removable magnetic disk 59 and a removable optical disk 61, it should be appreciated by those skilled in the art that other types of computer readable media which can store data that is accessible by a computer, such as magnetic cassettes, flash memory cards, digital video disks (DVDs), Bernoulli cartridges, random access memories (RAMs), read only memory (ROM), and the like, may also be used in the exemplary operating environment.

A number of program modules may be stored on the hard disk, removable magnetic disk 59, removable optical disk 61, ROM 54 or RAM 55, including an operating system 65, one or more application programs 66 (e.g. downloading module 20), other program modules 67 (which may include synchronization module 24), and program data 68. A user may enter commands and information into the desktop computer 16 through input devices such as a keyboard 70, pointing device 72. Other input devices (not shown) may include a microphone, joystick, game pad, satellite dish, scanner, or the like. These and other input devices are often connected to the processing unit 48 through a serial port interface 76 that is coupled to the system bus 52, but may be connected by other interfaces, such as a sound card, a parallel port, game port or a universal serial bus (USB). A monitor 77 or other type of display device is also connected to the system bus 52 via an interface, such as a video adapter 78. In addition to the monitor 77, desktop computers may typically include other peripheral output devices such as speaker and printers.

The desktop computer 16 may operate in a networked environment using logic connections to one or more remote computers (other than mobile device 18), such as a remote computer 79. The remote computer 79 may be another personal computer, a server, a router, a network PC, a peer device or other network node, and typically includes many or all of the elements described above relative to desktop computer 16, although only a memory storage device 80 has been illustrated in FIG. 4. The logic connections depicted in FIG. 4. include a local area network (LAN) 81 and a wide area network (WAN) 82. Such networking environments are commonplace in offices, enterprise-wide computer network intranets and the Internet.

When used in a LAN networking environment, the desktop computer 16 is connected to the local area network 81 through a network interface or adapter 83. When used in a WAN networking environment, the desktop computer 16 typically include sa modem 84 or other means for establishing communications over the wide area network 82, such as the Internet. The modem 84, which may be internal or external, is connected to the system bus 52 via the serial port interface 76. In a network environment, program modules depicted relative to desktop computer 16, or portions thereof, may be stored in the remote memory storage devices. It will be appreciated that the network connections shown are exemplary and other means of establishing a communications link between the computers may be used.

Desktop computer 16 runs operating system 65 that is typically stored in no-volatile memory 54 and executes on the processor 48. One suitable operating system is a "WINDOWS" brand operating system sold by Microsoft Corporation, such as "WINDOWS 95" or "WINDOWS NT", operating systems, other derivative versions of Windows brand operating systems, or another suitable operating system. Other suitable operating systems include systems such as the "MACINTOSH OS" sold from Apple Corporation, and the "OS/2 PRESENTATION MANAGER" sold by International Business Machines (IBM) of Armonk, N.Y. Application programs are preferably stored in program module 67, in volatile memory or non-volatile memory, or can be loaded into any of the components shown in FIG. 5 from a floppy diskette 59, CDROM disk 61, downloaded from a network via network adapter 83, or loaded using another suitable mechanism.

Figure 6:
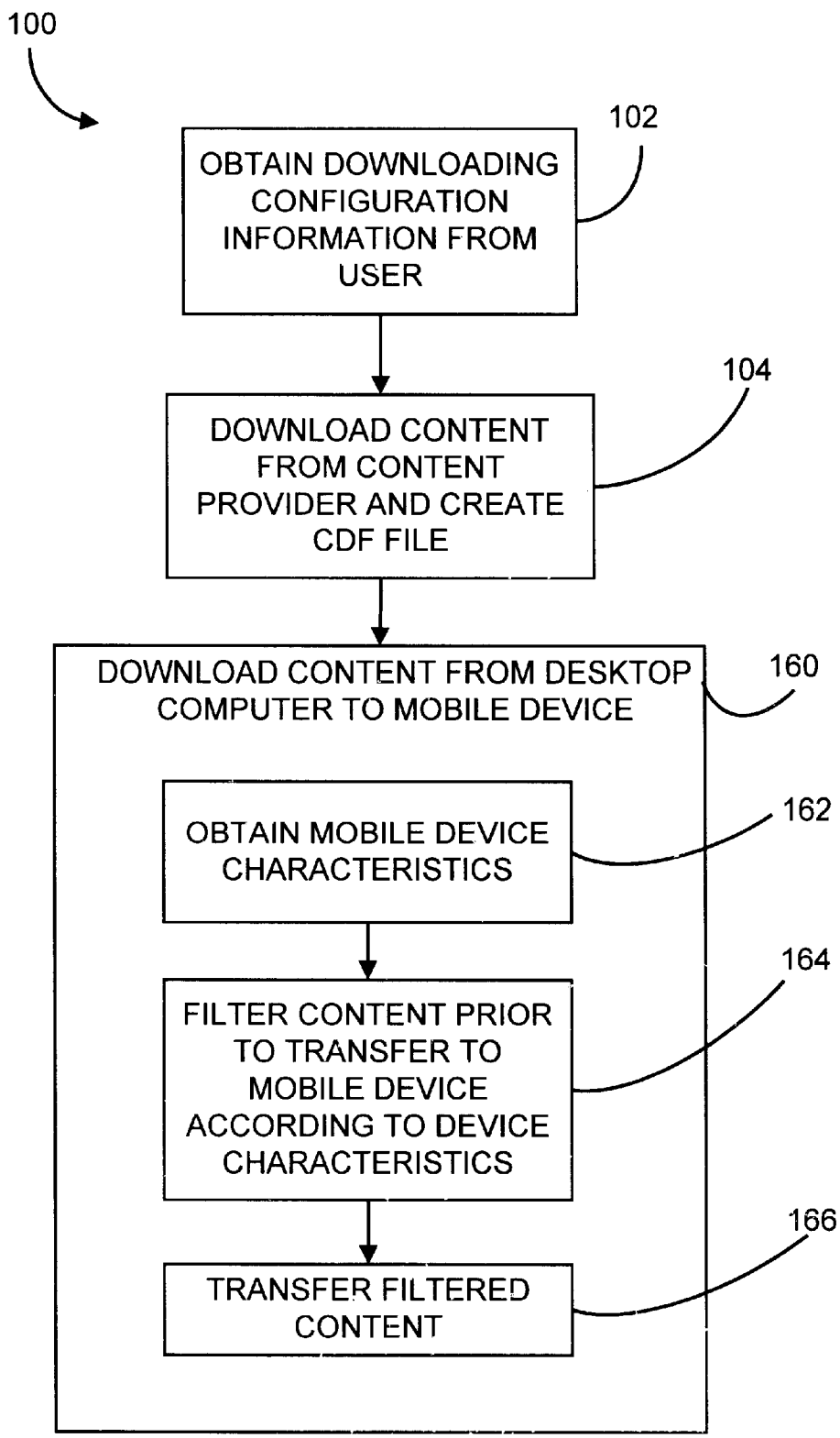
FIG. 6 is a flow diagram illustrating a method for downloading content from a content provider.

FIG. 6 illustrates a method 100 for obtaining and downloading content from the content provider 12 through the desktop computer 16 and to mobile device 18. Each of the steps illustrated in FIG. 6 and in the flow diagram of FIG. 7 are implemented using the downloading module 20, synchronizing modules 24 and 26 and filter module 30, described above. At step 102, a user desiring to download content to mobile device 18 for offline browsing preferably provides downloading user preferences that are used to access the desired content from content provider 12 and to limit the amount of content that is transferred to desktop computer 16, which is subsequently transferred to mobile device 18. The user preferences include the URL or similar address pointer used to access content provider 12 and specify content contained therein. The user preferences also act as a filter to limit the amount of content that is downloaded from content provider 12. Limitations can be expressed using a number of different parameters. For instance, the user can impose a limit as to the total quantity of content that is to be downloaded from content provider 12. Generally, the quantity is expressed in bytes; however, other units representing a quantity of digital data can also be used. If desired, the user can also limit how many levels of content organized in a hierarchical manner will be downloaded from content provider 12. Typically, hierarchical content stored at content provider 12 is accessed through "links", which allow the user to navigate up, down or directly to other portions of the hierarchical structure. In addition, content provider 12 may include links to "external" sites of content, which may be under the control of content provider 12 or be accessed through Internet 14 at other remote content providers. In one embodiment, the user preferences indicate whether or not to access and download content from the external sites.

In a further embodiment, the user preferences can include user selections regarding the type of information that will be downloaded from content provider 12. For instance, content at content provider 12 can include text data, image or graphical data and/or sound or audio data. It may be desirable for the user to limit which types of data that are downloaded to desktop computer 16 and subsequently transferred to mobile device 18 because of memory availability in cache 28 and/or the existence or non-existence of other hardware on mobile device 18 such as whether or not sound support exists. By indicating the types of data to be downloaded at step 102, the user can avoid unnecessary transfer of data to mobile device 18, and minimize the time necessary to complete downloading of content to desktop computer 16. From step 102, program flow continues to step 104 whereat downloading module 20 accesses content provider 12 and downloads content therefrom in accordance with the user preferences as well as creates a CDF file. The content and CDF file are stored in cache 22.

Figure 7A:
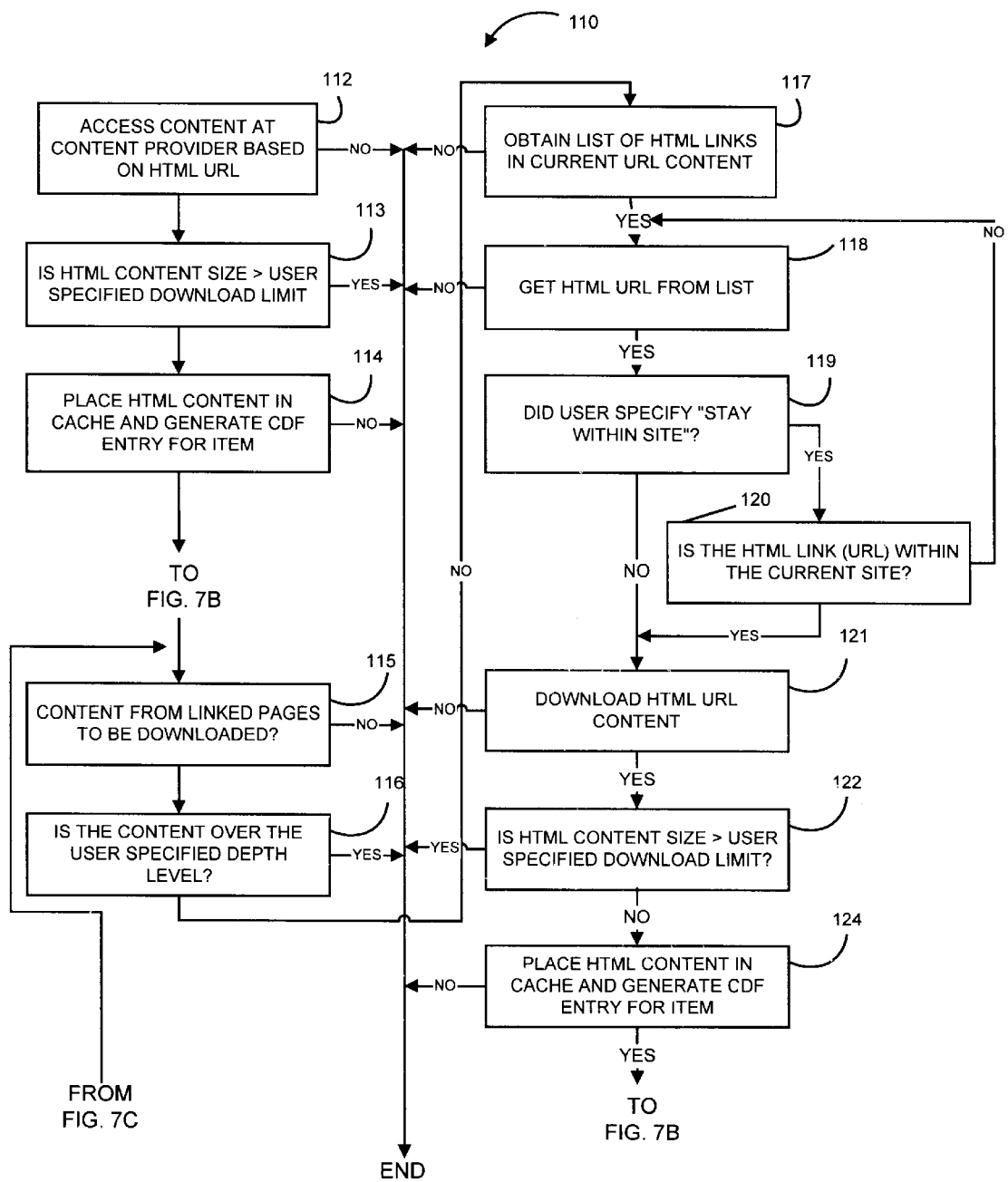
FIGS. 7A, 7B and 7C are a flow diagram illustrating detailed aspects of the method of FIG. 6.
Figure 7B:
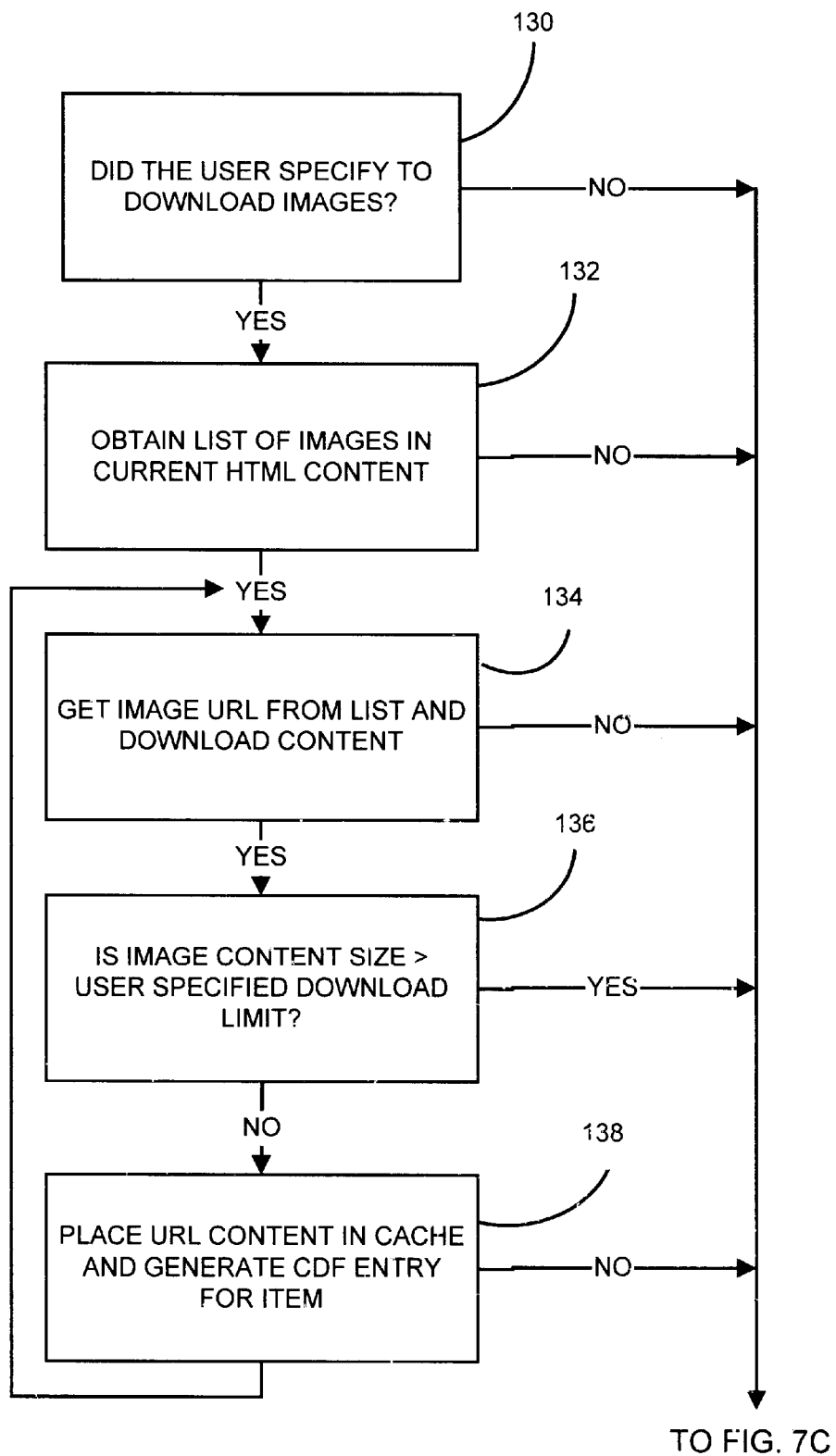
Figure 7C:
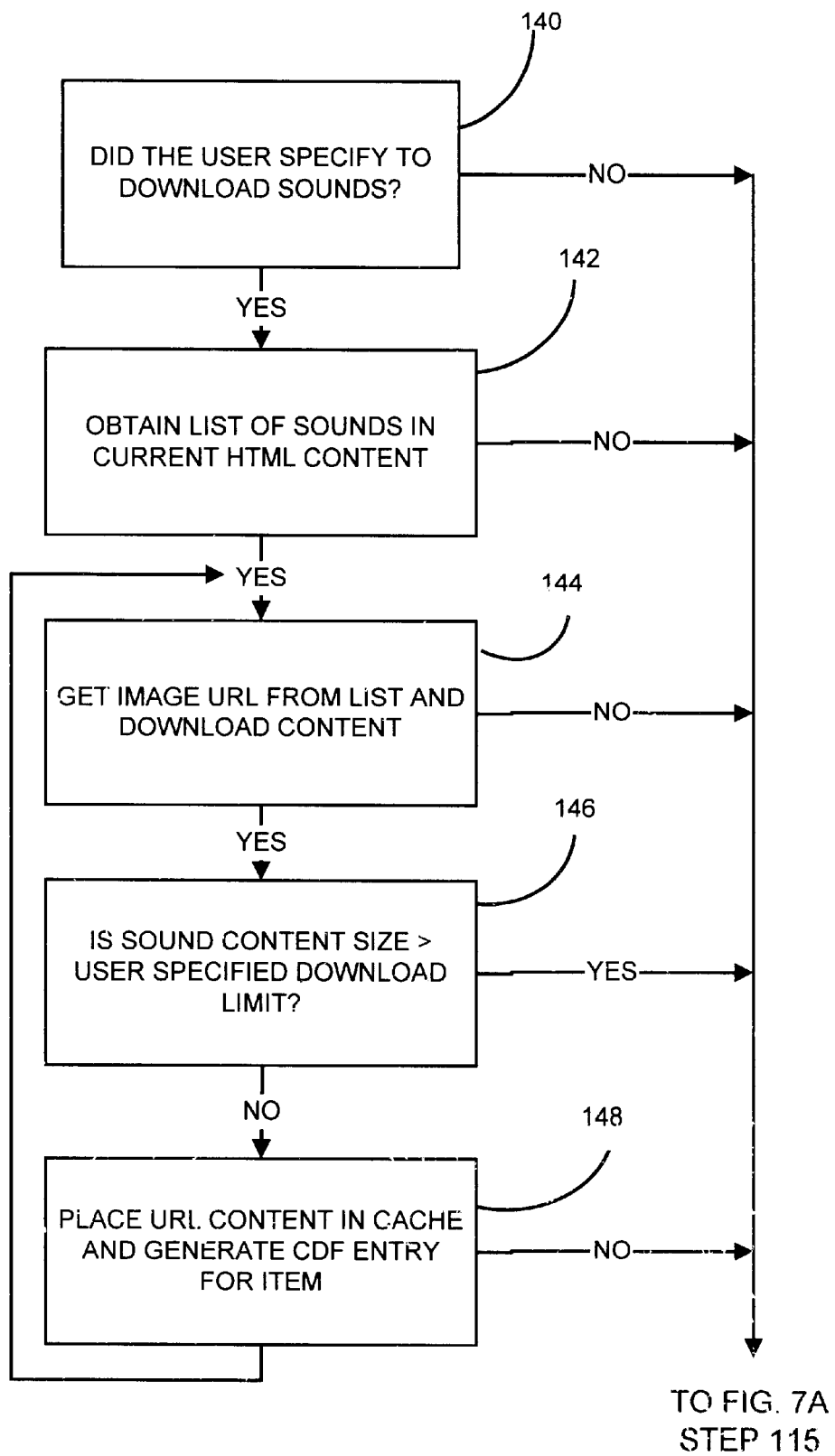

FIGS. 7A, 7B and 7C together illustrate an exemplary method 110 for downloading content from content provider 12 based on user preferences. At step 112, downloading module 20 accesses content at content provider 12 in accordance with the first or topmost specified URL or other address pointer and downloads the first page of content. If the HTML content does not exceed the user specified download limit at step 113, operational flow continues to step 114 whereat the HTML content is placed in cache 22 and CDF format topmost channel tags are placed in the CDF file. Referring to Table 1 below the topmost tags are indicated at "A".

TABLE 1

```
        <?XML version="1.0"?>
A       <CHANNEL HREF="http://home.microsoft.com/" ID="GM434790"
            BASE="http://home.microsoft.com/">
        <SELF HREF="http://home.microsoft.com/GM434790.cdf"/>
        <USAGE VALUE="MobileChannel"/>
        <ABSTRACT>This Mobile Channel was created for offline use!</ABSTRACT>
        <CHANSCPIPT VALUE="P434790"/>
        <ITEM HREF="http://home.microsoft.com/" ID="P434790."><USAGE
            VALUE="None"/></ITEM>
        <TITLE>Microsoft Internet Start</TITLE>
        <ITEM HREF="http://homeadvisor.msn.com/ie/financing/highlights.asp"
            ID="P806324">
          <TITLE>Financing Highlights - Microsoft HomeAdvisor</TITLE>
        </ITEM>
D       <CHANNEL HREF="personalizing/personalizing.asp" ID="C388888">
          <CHANSCRIPT VALUE="P388888"/>
          <ITEM HREF="personalizing/personalizing.asp" ID="P388888"><USAGE
              VALUE="None"/></ITEM>
```

TABLE 1-continued

```
         <TITLE>Personalize your Start page</TITLE>
         <ITEM HREF="personalizing/Header.asp" ID="P408086">
            <TITLE>Personalize Your Start page - Header</TITLE>
         </ITEM>
         <ITEM HREF="personalizing/Categories.asp#" ID="P470294"><USAGE
            VALUE="None"/></ITEM>
D     </CHANNEL>
      <ITEM HREF="exploring/exploring.asp" ID="P291536"><USAGE
B         VALUE="None"/></ITEM>
B     <ITEM HREF="hmchelp/help.asp" ID="P500560"><USAGE VALUE="None"/></ITEM>
      <ITEM HREF="isapi/bin/redir.dll?target=http://business.msn.com&Cbiz&"
         ID="P871609"><USAGE VALUE="None"/></ITEM>
      .
      .
      .
      <ITEM HREF="isapi/bin/redir.dll?target=http://www.ca.msn.com&INTLCA&"
C         ID="P83646"><USAGE VALUE="None"/></ITEM>
      <ITEM HREF="isapi/bin/redir.dll?target=http://start.fr.msn.com&INTLFR&"
C         ID="P339813 "><USAGE VALUE="None"/></ITEM>
      </CHANNEL>
A
```

Operational flow then continues to step 130 in FIG. 7B to determine if image content is to be downloaded. At step 130, the user preferences are examined, and if images are to be downloaded, a list of image content URLs in the current HTML content is obtained at step 132. In steps 134, 136 and 138, the images from the list of image content URLs are sequentially downloaded wherein the individual size of the image and/or the total amount of image content so far stored is compared with the user preferences, and if not exceeded, is stored in cache 22. For each image, a CDF format URL entry is provided in the CDF file. In Table 1, images are indicated at "B" for the topmost channel.

Operational flow then continues to step 140 in FIG. 7C to determine if sound or audio content (for example, audio clips) is to be downloaded. Steps 140, 142, 144, 146 and 148 are similar to steps 130, 132, 134, 136 and 138, discussed above. At step 140, the user preferences are examined, and if audio content is to be downloaded, a list of audio content URLs in the current HTML content is obtained at step 142. In steps 144, 146 and 148, the audio clips from the list of audio content URLs are sequentially downloaded wherein the individual size of the audio clip and/or the total amount of audio content so far stored is compared with the user preferences, and if not exceeded is stored in cache 22. For each audio clip, a CDF format entry is provided in the CDF file. In Table 1, audio clips are indicated at "C" for the topmost channel.

Referring back to FIG. 7A, operational flow then continues to step 115 whereat the user preferences are examined to determine if content from linked pages should be downloaded. Assuming this is the case, the user preferences are then examined to determine if the next level of linked pages will exceed the user preferences at step 116. If such is not the case, operational flow continues to step 117 whereat the list of HTML links is obtained for the current URL content. The first HTML URL link in the list is then obtained at step 118. At step 119, the user preferences are examined to determine if the user desired to stay within the current site, or allow links to external sites. At step 120, if the user preferences indicate that the user desired to stay within the current site, the HTML link obtained at step 118 is compared with the current HTML URL. If the comparison realizes that the HTML link from step 118 is not within the site, the operational flow returns to step 118 and the next HTML URL is obtained. However, if the HTML URL from step 118 is within the site, or the user preferences indicate that "external" sites will also be accessed and downloaded, operational flow continues to step 121. At step 121, the HTML content for the URL from step 118 is downloaded. At step 122, the total HTML content size (with the newly downloaded content) is compared with the user preferences, and if not exceeded, operational flow continues to step 124 whereat the HTML content for the HTML URL from step 118 is stored in cache 22 and CDF channel tags are placed, in the CDF file as indicated at "D" in Table 1.

From step 124, operational flow continues to steps 130–138 of FIG. 7B and steps 140–148 of FIG. 7C to download image and audio content, as described above. After downloading the image and audio content, if desired, operational flow returns to step 118 where the next HTML URL for the next link is obtained. Each link from the list HTML links is processed as described above in order that each level of the site is downloaded before further, lower levels are obtained. Once a complete level of the site has been processed, operational flow returns to step 115 to determine if further levels should be processed.

At this point, it should be noted that the CDF file stored in cache 22 can include further entries. For, instance, "Title" and "Abstract" tags and entries can be inserted as illustrated in Table 1. If the mobile device browser 32 (FIG. 1) also operates pursuant to script files, it may be necessary to also include a "Channelscript" tag and reference in order that a blank script is file is implemented during offline browsing. Use of script files is described in detail in U.S. patent application Ser. No. 09/107,666 filed Jun. 30, 1998, entitled "SYSTEM FOR DELIVERING DATA CONTENT OVER A LOW BIT RATE TRANSMISSION CHANNEL" and U.S. patent application Ser. No. 09/107,941 filed Jun. 30, 1998, entitled "CHANNEL DEFINITION ARCHITECTURE EXTENSION", the contents of which are hereby incorporated by reference.

Referring back to FIG. 6, downloading of content and the CDF file stored in cache 22 of desktop computer 16 to cache 28 of mobile device 18 occurs at step 160. In a preferred embodiment, downloading content from desktop computer 16 to mobile device 18 includes, at step 162, obtaining characteristic information about mobile device 18, such as video display capabilities, audio display capabilities, browser 32 capabilities, or other information related to the hardware or software on mobile device 18 that is implemented during offline browsing. Typically, characteristics of mobile device 18 include the type and model of mobile device 18 as well as the type, model or version level of hardware and software components of mobile device 18. Such information is commonly maintained by operating system 40 (FIG. 2) and can be accessed and transferred to desktop computer 16 using well-known API calls.

At step 166, content from cache 22 of desktop computer 16 is transferred to cache 28 of mobile device 18 using synchronization modules 24 and 26. However, as will be described below, content data is filtered or transformed by filter module 30 in accordance with characteristics or capabilities of mobile device 18 as obtained from seep 162. Filtering of content data prior to transfer and storage in cache 28 is particularly advantageous dale to the limited memory resources commonly found in mobile devices. For instance, if mobile device 18 cannot support or render a particular form of content downloaded from content provider 12, filtering module 30 can omit this information prior to transfer to mobile device 18. In another example, mobile device 18 can have limited or no ability to display colors. Accordingly, filtering module 30 can replace or omit information related to colors, and thereby, convert the content to be displayed in a format which is more suitable for the mobile device 18, such as a gray-scale format. Typically, images displayed in color require considerably more bytes than that necessary to display the same image using a gray-scale format. By converting the image data to the gray-scale format prior to storage in cache 28, considerable storage savings can be realized.

Figure 8:
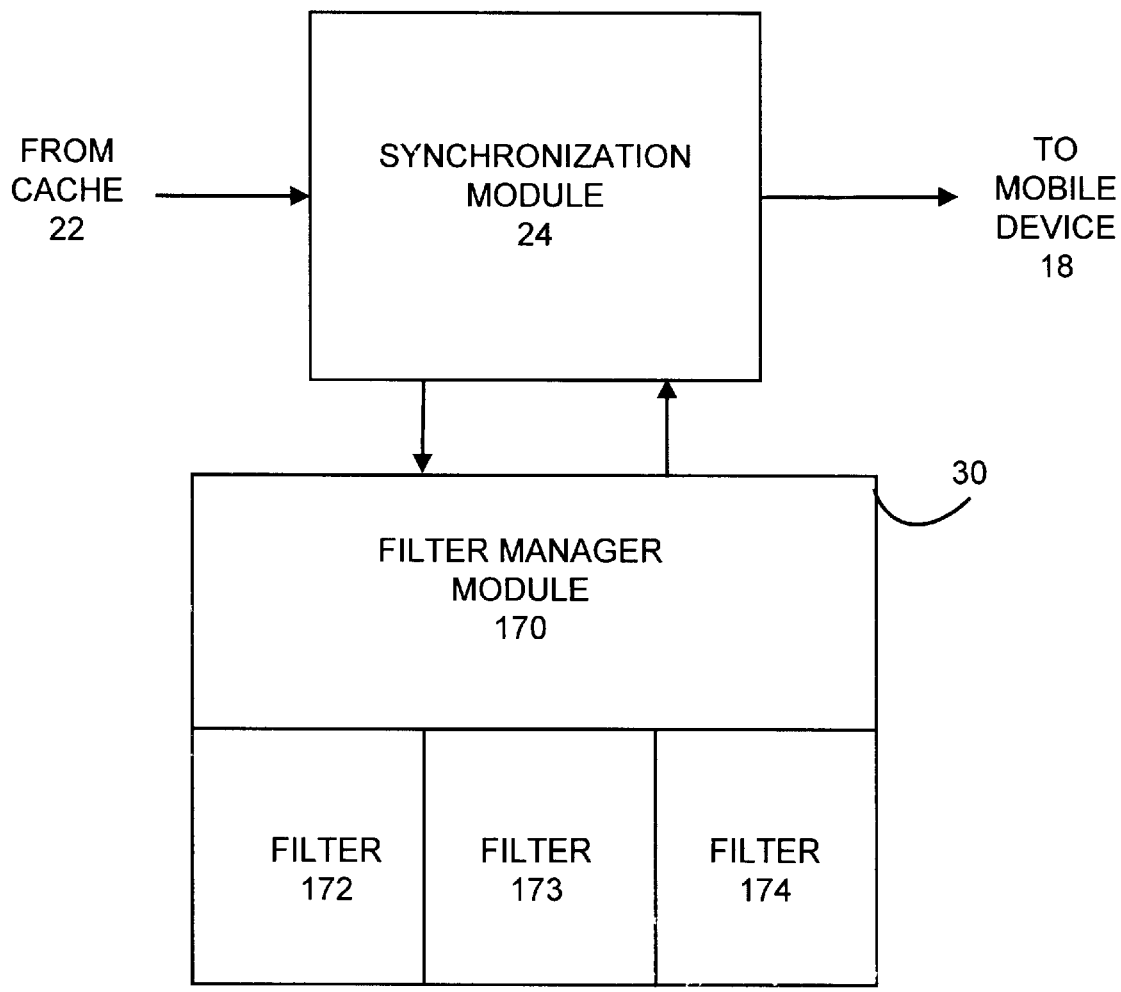
FIG. 8 is a block diagram of a filtering module.

FIG. 8 illustrates synchronization module 28 and filter module 30 in greater detail. In the embodiment illustrated, filtering module 30 includes a filter manager module 170 and separate content-type filtering modules 172, 173 and 174. Filtering module 30 is an open architecture wherein each of the content-type filtering modules 172–174 can be written separately and registered with filter manager module 170. Generally, filter manager module 170 controls content data transfer to and from synchronizing module 28, while filtering or conversion of content data is performed by content-type filtering modules 172–174. Although illustrated wherein three filtering modules 172–174 are present, it should be understood that any number of filtering modules can operate with filter manager module 170. Generally, content-type filtering modules 172–174 are "registered" with filter manager module 170 wherein filter manager module 170 maintains a list of available content-type filtering modules 172–174 and the type of data each filtering module 172–174 operates upon. In this manner, the filter manager module 170 can operate the desired content-type filtering module 172–174 upon ascertaining the type of content to be transferred. It should be noted that filtering modules 172–174 need not be limited to one type of content data, such as "WAV" data, "HTML" data, "BMP" data, etc., but can be written to perform filtering or conversion for multiple types of content data.

In an exemplary, method of operation, synchronization module 24 first determines which content in cache 28 is out of date or simply not stored in cache 28. The synchronization module 24 passes this information to filter manager module 170. Filter manager module 170 accesses cache 22 in order to determine the content type of content to be transferred to mobile device 18. The type of content can be ascertained by using known APIs, wherein the type of content is defined by known data protocol standards. One such standard includes Multipurpose Internet Mail Extensions (MIME) that defines a format of messages used on the Internet. After determining the content type to be transferred, the filter manager module 170 ascertains which, if any, content-type filtering modules 172–174 have been registered to filter or convert the specific type of content data. In one embodiment, filtering modules 172–174 comprise streaming filters that allow filtering to be performed asynchronously so that content data can be filtered or converted under separate operating threads to allow other actions to be performed by desktop computer 16 during transfer of content data from desktop computer 16 to mobile device 18. In the embodiment illustrated, filter manager module 170 opens a stream using the URL from the stored CDF file in cache 22. A stream handle is then obtained indicating what portion of cache 22 contains the desired content. A stream handle is similar to a file handle commonly used in operating systems. Filter manager module 170 then passes the stream handle to one of the filtering modules 172–174 that will filter or convert the content data. As content data is converted, it is passed back to filter manager module 170, which in turn, passes it to synchronization module 24 for transmission to and storage in cache 28.

In one exemplary embodiment, the above-described information is passed between filter manager module 170 and filters 172–174 using APIs. In addition to standard ("Read"), ("Seek"), and ("Write") interface APIs, additional APIs include:

SetFilterStream([in] IStream * pStreamIn, [in] BSTR bstrURL, [in] BSTR bstrContentType)

Where, pStreamIn—Raw stream to be filtered bstrURL—URL of the resource pointed to by pStreamIn bstrContentType—MIME content type as detected by the Filter Manager SetFilterStream sets the stream, to be filtered. This API also defines the source of the stream, and its content type (for filters which may handle more than one content type).

SetFilterParam([in] UINT uFilterParam, [in] DWORD dwFilterValue)

Where, uFilterParam—Filter specific configuration parameter dwFilterValue—Filter specific configuration value SetFilterParam sets filter specific parameters. For instance, this API can be used to provide bits-per-pixel for image filters, or information about the destination device HTML levels support for HTML filters.

If desired, another API can be provided to allow a filter to display a user interface for setting filter specific configuration information not otherwise set via the SetFilterParam API. Such an API can take the form:

Customize ([in] OLE-HANDLE hwndparent)

Where, hwndParent—Parent window for configuration dialog box.

Figure 9:
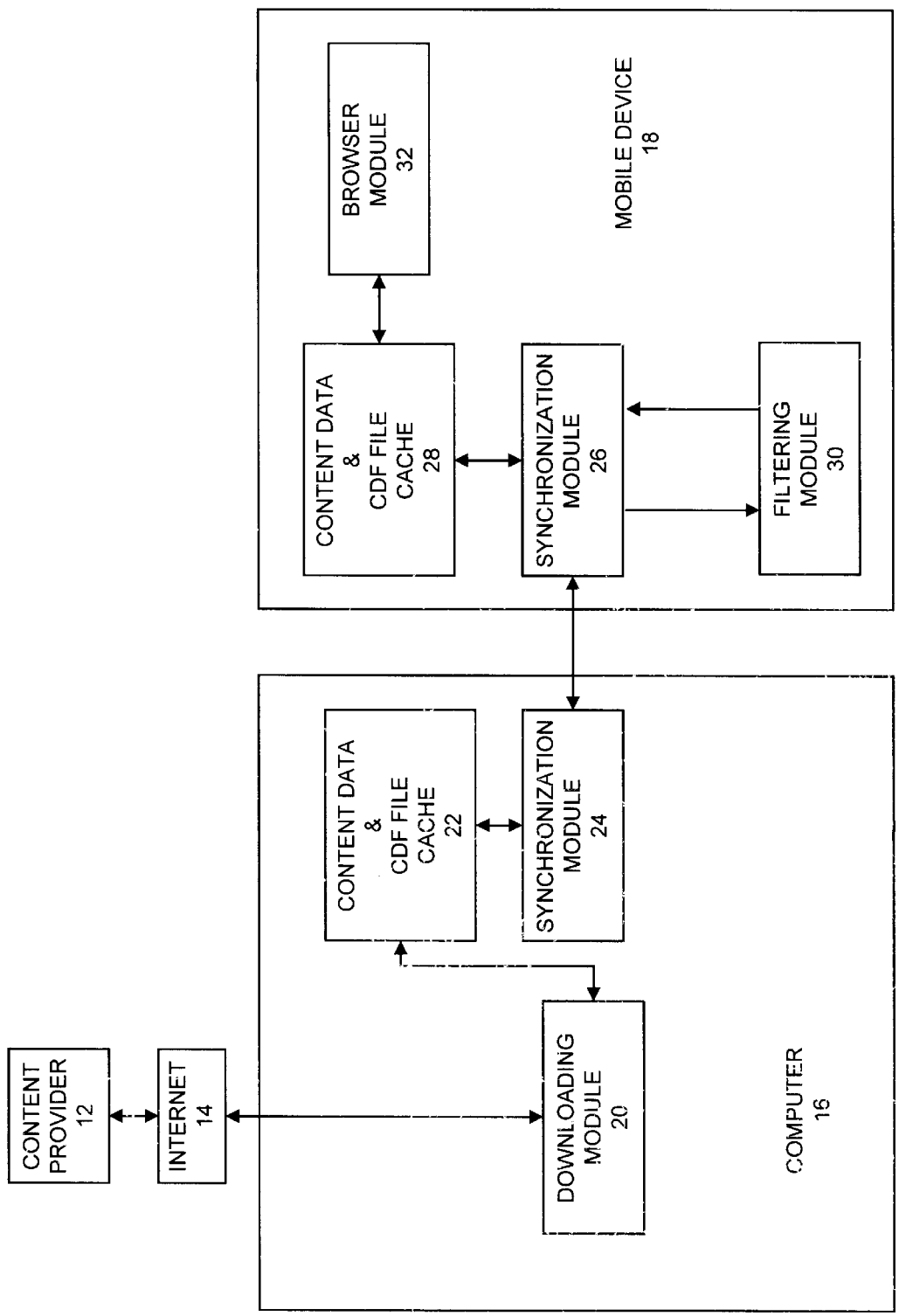
FIG. 9 is a simplified block diagram illustrating another embodiment of a mobile device in a system in accordance with the present invention.
Figure 10:
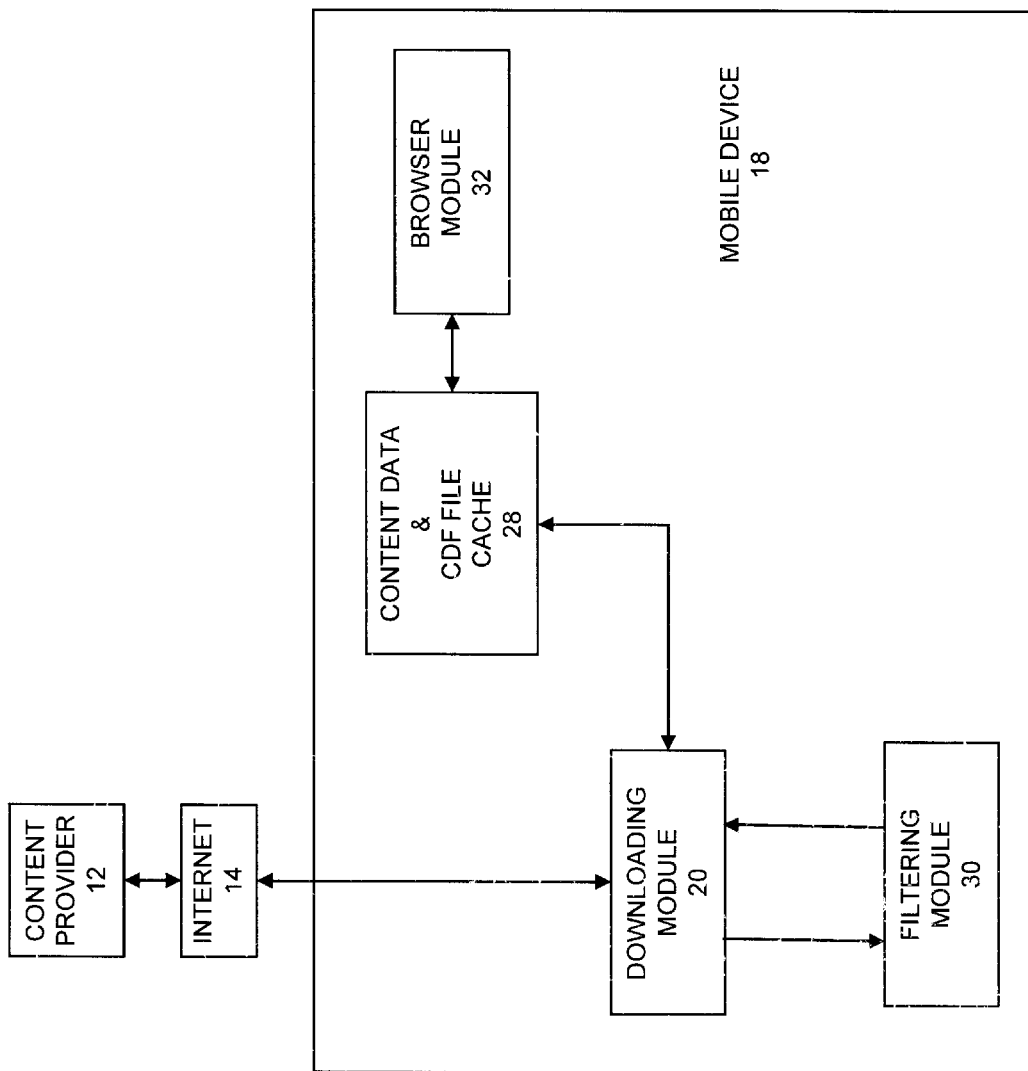
FIG. 10 is a simplified block diagram illustrating a mobile device directly connectable to a content source provider.

FIGS. 9 and 10 illustrate other embodiments of the present invention. The embodiment of FIG. 9 is substantially similar to the embodiment of FIG. 1 discussed above; however, in this embodiment, filtering module 30 resides on mobile device 18 rather than on computer 16. The system of FIG. 9 operates substantially similar to the system of FIG. 1 wherein steps 102, 104 and 160 of FIG. 6 are performed. However, in this embodiment, the filtering of content is performed on mobile device 18, thus content data in cache 22 is transferred from synchronization module 24 to synchronization module 26 whereat content data is filtered prior to storage in cache 28.

The embodiments of FIGS. 1 and 9 demonstrate that the filter module 30 can operate on both the computer 16 and the mobile device 18. It should be noted that, if desired, filter modules can be present on both the computer 16 and the mobile device 18 wherein the filter modules operate on different types of content information.

In the embodiment of FIG. 10, downloading module 20 resides on mobile device 18 in addition to filtering module 30. In this embodiment, mobile device 18 can access content at content provider 12 without the need for content to be first downloaded to computer 16 and subsequently transferred to mobile device 18 using synchronizing modules 24 and 26. In this embodiment, downloading module 20 operates with filtering module 30 in order to filter or transform content from content provider 12 prior to storage in cache 28. Downloading module 20 accesses content provider 12 and downloads content according to the user preferences. Based on the type of content data downloaded, filtering module 30 filters or transforms the content data according to characteristics or capabilities of mobile device 18.

Although the present invention has been described with reference to preferred embodiments, workers skilled in the art will recognize that changes may be made in form and detail without departing from the spirit and scope of the invention.

What is claimed is:

1. A method for transferring selected content information organized in a hierarchical structure of a wide area network for offline browsing from a host computer to a mobile device, the method comprising:

connecting the mobile device to the host computer to form a communication link;

selecting a portion of the hierarchical structure to be transferred to the mobile device, the portion comprising multiple levels of the hierarchical structure;

obtaining content information corresponding to the portion by traversing through the portion of the hierarchical structure;

obtaining characteristic information of the mobile device pertaining to at least one of hardware and software capabilities of the mobile device; and transferring the content information from the host computer to memory on the mobile device as a function of the characteristic information via the communications link.

2. The method of claim 1 wherein the step of transferring comprises transforming the content information prior to transmitting the content information to the mobile device.

3. The method of claim 1 wherein the step of transferring comprises transforming the content information on the mobile device prior to storage in the memory.

4. The method of claim 1 and further comprising detecting a type of the content information to be transferred.

5. The method of claim 4 and further comprising:

storing content-type filtering modules on the host computer;

selecting a content-type filtering module as a function of the type of the content information to be transferred; and wherein the step of transferring includes passing the content information to be transferred through the selected content-type filtering module, the content-type filtering module operating upon the content information.

6. The method of claim 5 and further comprising passing an address pointer to the selected content-type filtering module indicating a location of the content information to be transferred.

7. The method of claim 5 and further comprising passing a filter parameter to the selected content-type filtering module indicative of the characteristic information.

8. The method of claim 1 and further comprising:

connecting to a content provider through the wide area network, the content provider having the content information;

obtaining user preferences of the content information to be obtained from the content provider; and transferring the content information from the content provider to the host computer as a function of the user preferences.

9. The method of claim 8 wherein the user preferences include indications of the type of content information to be obtained.

10. The method of claim 9 wherein the user preferences include indications as to where the content information is to be obtained.

11. A computer readable medium including instructions readable by a computer which, when implemented, cause the computer to handle information by performing steps comprising:

selecting a portion of a hierarchical structure of content information to be transferred to a mobile device, the portion comprising multiple levels of the hierarchical structure;

downloading content information corresponding to the portion from a wide area network to a host computer by traversing through the portion of the hierarchical structure;

obtaining characteristic information of a mobile device connectable to the host computer, the characteristic information pertaining to at least one of hardware and software capabilities of the mobile device; and transferring the content information from the host computer to memory on the mobile device via a communications link as a function of the characteristic information.

12. The computer readable medium of claim 11 wherein the step of transferring comprises transforming the content information prior to transmitting the content information to the mobile device.

13. The computer readable medium of claim 11 wherein the step of transferring comprises transforming the content information on the mobile device prior to storage in memory.

14. The computer readable medium of claim 11 including instructions readable by a computer which, when implemented, cause the computer to handle information by performing a step comprising:

detecting a type of the content information to be transferred.

15. The computer readable medium of claim 14 including instructions readable by a computer which, when implemented, cause the computer to handle information by performing steps comprising:

selecting a content-type filtering module as a function of the type of the content information to be downloaded; and wherein the step of transferring includes passing the content information to be downloaded through the selected content-type filtering module, the content-type filtering module operating upon the content information.

16. The computer readable medium of claim 15 including instructions readable by a computer which, when implemented, cause the computer to handle information by performing a step comprising:

passing an address pointer to the selected content-type filtering module indicating a location of the content information to be downloaded.

17. The computer readable medium of claim 11 including instructions readable by a computer which, when implemented, cause the computer to handle information by performing a step comprising:

passing a filter parameter to the selected content-type filtering module indicative of the characteristic information.

18. The computer readable medium of claim 11 including instructions readable by a computer which, when implemented, cause the computer to handle information by performing steps comprising:

connecting to a content provider through a wide area network, the content provider having the content information;

obtaining user preferences of the content information to be obtained from the content provider; and transferring the content information from the content provider to the host computer as a function of the user preferences.

19. A system for viewing content information organized in a hierarchical structure of a wide area network offline, the system comprising:

a selection module for selecting a portion of the hierarchical structure to be transmitted, the portion comprising multiple levels of the hierarchical structure;

a host computer comprising:
  a first module for downloading content information corresponding to the portion by traversing through the selected portion of the hierarchical structure; and
  a second module for transmitting the content information via a communications link;

a mobile device comprising:
  a third module for receiving the content information from the second module; and
  a fourth module for selectively viewing the content information; and wherein at least one of the host computer and the mobile device includes a fifth module for operating on the content information as a function of characteristic information of the mobile device pertaining to at least one of hardware and software capabilities of the mobile device.

20. The system of claim 19 wherein the fifth module comprises:

a plurality of content-type filtering modules for operating on a selected type of content information; and a managing module for selecting a content-type filtering module as a function of the type of the content information to be downloaded.

21. The system of claim 20 wherein the content-type filtering modules comprise streaming filters.

22. A mobile device for viewing content information organized in a hierarchical structure of a wide area network, the mobile device comprising:

a selection module for selecting a portion of the hierarchical structure, the portion comprising multiple levels of the hierarchical structure;

a first module for downloading content information corresponding to the selected portion from a content provider via a communications link by traversing through the selected portion of the hierarchical structure;

a second module for selectively viewing content information; and a third module for operating on the content information as a function of characteristic information of the mobile device pertaining to at least one of hardware and software capabilities of the mobile device.

23. The mobile device of claim 22 wherein the third module comprises:

a plurality of content-type filtering modules for operating on a selected type of content information; and a managing module for selecting a content-type filtering module as a function of the type of the content information.

24. The system of claim 23 wherein the content-type filtering modules comprise streaming filters.

25. A method for obtaining offline browsing content information organized in a hierarchical structure of a content provider for use on a mobile device, the method comprising:

selecting a portion of the hierarchical structure to be transferred to the mobile device, the portion comprising multiple levels of the hierarchical structure;

obtaining content information corresponding to the selected portion by traversing through the selected portion of the hierarchical structure;

obtaining characteristic information of the mobile device pertaining to at least one of hardware and software capabilities of the mobile device; and transferring the portion via a communications link to memory on the mobile device as a function of the characteristic information.

26. The method of claim 25 and further comprising detecting a type of the content information.

27. The method of claim 26 and further comprising:

selecting a content-type filtering module as a function of the type of the content information to be transferred; and wherein the step of transferring includes passing the content information to be transferred through the selected content-type filtering module, the content-type filtering module operating upon the content information.

28. A method for obtaining offline browsing content information organized in a hierarchical structure of a content provider for use on a mobile device, the method comprising:

obtaining user preferences of content information to be downloaded from a content provider;

connecting to the content provider via a communications link;

downloading content information from the content provider as a function of the user preferences;

generating a file having tags associated with the content information downloaded and comprising multiple levels of the hierarchical structure; and storing the content information and the file in memory of the mobile device.

29. The method of claim 28 wherein the step of downloading comprises downloading content information to a host computer, and the method further comprises transferring the content information to the mobile device.

30. The method of claim 28 and further comprising:

obtaining characteristic information of the mobile device pertaining to at least one of hardware and software capabilities of the mobile device; and transferring the content information to memory on the mobile device as a function of the characteristic information.

31. The method of claim 28 wherein the content information is organized in a hierarchical structure, wherein the file relates to the hierarchical structure of the content information and wherein downloading the content information includes traversing through the hierarchical structure of the content information.

* * * * *